UNITED STATES PATENT OFFICE.

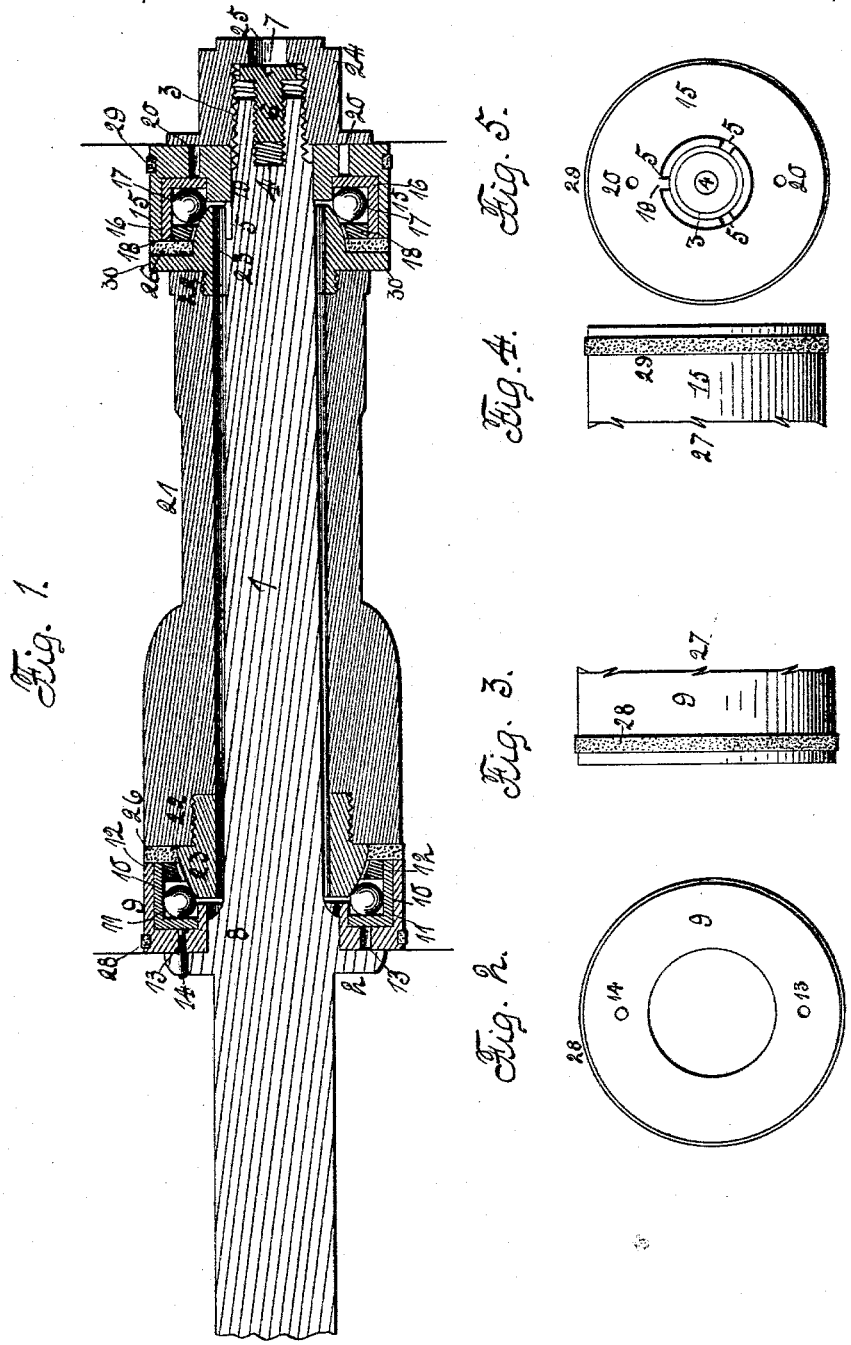

GEORGE GREENLEE, JR., OF BELVIDERE, ILLINOIS.

VEHICLE-AXLE.

SPECIFICATION forming part of Letters Patent No. 584,129, dated June 8, 1897.

Application filed March 16, 1896. Serial No. 583,487. (No model.)

*To all whom it may concern:*

Be it known that I, GEORGE GREENLEE, Jr., a citizen of the United States, residing at Belvidere, in the county of Boone and State of Illinois, have invented certain new and useful Improvements in Vehicle-Axles, of which the following is a specification.

This invention relates to that class of vehicle-axles in which a ball-bearing is provided; and it consists of various details of construction pointed out in the claims.

In the accompanying drawings, Figure 1 is a lengthwise section through my improved axle. Fig. 2 is an end view of the inner cup. Fig. 3 is a plan view of the inner cup. Fig. 4 is a plan view of the outer cup. Fig. 5 is an end view of the outer cup and its connection with the shank.

The axle has the usual shank 1, provided with a collar or flange 2, having its outer end 3 externally screw-threaded. This outer end of the shank has an internal screw-threaded socket 4, and that portion of the end at the beginning of the screw-threads is provided with three lengthwise grooves 5. A screw 6 has a connection with the socket 4, its head provided with the usual notch 7. The inner end of the shank has an enlargement 8, upon which is located a cup 9, having a lining 10, and balls 11, located in the lining and held in position by a ring 12. This cup has two openings 13, in one of which is placed a pin 14, extending through an opening in the flange 2 of the axle, thereby forming a connection between the shank and cup in order that the cup may be held stationary, and through the openings 13 a pin may be driven, thereby freeing the lining from the cup, and the cup may be turned so that the entire opening may be brought in line with the pin and the pin placed in the opening, thereby changing the position of the cup, as the greatest wearing action occurs on the upper half of the cup. This cup has a circumferential groove, within which is placed a packing-ring 28. Upon the outer end of the shank is located a cup 15, having a lining 16. Balls 17 are placed within the lining and are held in position by a ring 18, located in the lining which holds the balls in position. This cup has a central opening provided with a projection 19, which fits within one of the grooves 5 of the shank, thereby forming a connection between the cup and shank, holding the cup against rotation, and by means of the projection and the series of grooves the position of the cup can be adjusted circumferentially, so that the wear upon the cup will be distributed more evenly. Two openings 20 extend through the cup, through which pins may be driven to disengage the lining from the cup. This cup has a circumferential groove, within which is located a packing 29.

A sleeve 21 is located upon the shank 1, having a central opening of larger diameter than the shank in order that a contact may not be made, and each end of the sleeve has an internally-screw-threaded socket, within which is located the screw-threaded shank 22 of a cone 23. These cones are convex in outline and are located in contact with the balls, thereby holding the sleeve suspended free of the shank 1.

A nut 24 has a screw-threaded connection with the end of the shank and has an opening 25 in its end. By means of this nut the cup 15 can be forced inward to insure a contact between the balls and cones. The screw 6 can be turned to limit the movement of the nut 24, which will limit the inward movement of the outer cup, and this adjustment of the screw can take place without removing the nut by inserting a screw-driver through the opening 25 in the nut. A ring 26, of packing material, is placed between the inner cup and the end of the sleeve and between the outer cup and a flange 30, extending from the outer cone, in order to exclude water and dust. The faces of the cups are provided with sharp projections 27, (shown at Figs. 3 and 4,) which hold the packing-rings 26 stationary with the cups in order that the dirt may not be ground in between the parts.

The packing-rings 28 and 29, located in the periphery of the cups, serve to exclude water and dust from the joint connection between the cups and hub, as they form a tight joint with the hub.

I claim as my invention—

1. In an axle-bearing, the combination with a stationary shank, of a rotatable sleeve located upon the shank, a cone at each end of the sleeve, a bearing-cup arranged adjacent to each cone and supported against rotation by the shank, an angular lining removably connected to each cup, a series of balls loosely arranged between and having their bearing upon said linings and cones, and a packing-ring surrounding each of said cones and held against rotation by means of projections on each cup which engage with the said packing-rings, substantially as described.

2. In an axle-bearing, the combination with a stationary shank provided with a plurality of longitudinal grooves at its outer end and with screw-threads crossing said grooves, of an adjustable bearing-cup slidable on said shank and having a projection adapted to fit either of said grooves so as to hold the cup against rotation, and a nut screwed upon the end of said shank and bearing against the adjustable cup, substantially as described.

3. In an axle-bearing, the combination with a stationary shank having a threaded end and a threaded socket in its end, and provided also with longitudinal grooves near its end, of a sleeve rotatably mounted upon said shank, a convex bearing-cone at each end of the sleeve, an adjustable bearing-cup arranged adjacent to each cone and held against rotation upon the shank, a projection on the outer cup adapted to enter either of the grooves in the shank so as to hold the said cup in its adjusted position, a packing-ring surrounding each cone, a series of balls loosely interposed between each cup and cone, a headed screw adjustably tapped into the socket in the end of the shank, and an internally-threaded nut screwed upon the latter and having an aperture in its end of less diameter that the head of the screw, said nut acting upon the head of the screw and upon the outer bearing-cup, substantially as described.

4. In an axle-bearing, the combination with a stationary shank, of a rotatable sleeve mounted upon the shank, a cone-bearing at each end of the sleeve, a cup arranged at each end of the sleeve and each supported against rotation, said cups being provided with a peripheral groove and with sharp projections on one edge, a stationary ring of packing material located in each groove, balls interposed between each cone and cup, and a packing-ring surrounding each cone and held against rotation by means of the sharp projections on the said cups, substantially as described.

GEORGE GREENLEE, Jr.

Witnesses:
WILL A. GREENLEE,
S. W. WOODHOUSE.